United States Patent Office 2,791,519
Patented May 7, 1957

2,791,519

RUBBER ARTICLE COATED WITH TERPOLYMER OF BUTADIENE, ACRYLONITRILE, AND METHACRYLIC ACID

Roscoe H. Gerke, Nutley, and Theodore Shevzov, Garfield, N. J., assignors to United States Rubber Company, New York, N. Y., a corporation of New Jersey No Drawing. Application May 18, 1955,
Serial No. 509,424

2 Claims. (Cl. 117—138.8)

This invention relates to a new coated article comprising a vulcanized rubber product lacquered with a coating of a terpolymer of butadiene, acrylonitrile and methacrylic acid.

It is often desirable to coat a rubbery material with a flexible lacquer in order to improve the abrasion resistance and appearance (gloss) of the material; to increase the resistance of the material against atmospheric oxidation; to increase the "slip," i. e., the ease of sliding another object over the material; etc. Preferably the lacquer also should be easy to apply without the use of complicated machinery or high temperatures, and the dried lacquer film should be substantially transparent so that at will one either can retain the unchanged color of the base material by use of the clear lacquer or can give it any desired color by the addition of suitable pigment or dye. The coating also should adhere well to the rubbery material, should not be tacky or easily marred by, for example, the finger nails, should be scuff-resistant and ozone-resistant, and should be as flexible as the base material.

Previously used lacquer materials are deficient in one or more of these properties. For instance, it has been suggested that copolymers of butadiene and methacrylic acid be used in such lacquer coatings. However, such coatings do not adhere well enough to vulcanized rubbers, and do not protect the rubber to any extent against atmospheric oxidation.

We have now found that certain terpolymers of butadiene, acrylonitrile and methacrylic acid have all of the desirable properties mentioned above. This is most surprising because Semon—U. S. Patent 2,395,017—says that such terpolymers are plastic and tacky materials unless they are cured conventionally with sulfur. Plastic, tacky materials would be expected to be easily marred by the finger nails, and, of course, would seem totally unsuitable for applications where high slip is desired, e. g., for lacquers on rubberized upholstery, rubberized automobile seat covers, etc. Obviously a lacquer used on such a product not only should not stick to a person's clothing, but also, preferably, it should let a person slide across the lacquered material more easily than across the corresponding unlacquered material. Thus, it is apparent that our lacquers have valuable and entirely unexpected advantages over those of the prior art.

It is a decided and unexpected advantage of the invention that no cure of the coating is necessary, since the lacquer dries to a firm, non-tacky state without cure.

The terpolymers which are used in our invention are made conventionally, e. g., as shown by Semon, loc. cit., from the said monomers. The suitable range of amount of each monomer, in percentage by weight, contained in the terpolymer is from about 40% to 80% of butadiene, from about 10% to about 50% of acrylonitrile and from about 2% to about 25% of methacrylic acid.

The terpolymer is dissolved in any desired solvent, suitably a polar organic liquid such as butanone (also called methyl ethyl ketone or MEK), or a solvent, or mixture of solvents, which has similar solvent power. This can be determined as described by Hildebrand and Scott, Solubility of Nonelectrolytes, 3rd ed. (Reinhold), N. Y. (1950), pp. 424–439. A mixture of xylene and ethyl alcohol (80:20 by weight) is particularly suitable in making the lacquers used in this invention.

The total solid content of the lacquer, including any optional ingredients which are dissolved or suspended in the solution, ranges typically between about 1% and about 40% by weight. In general, concentrated solutions are used when the lacquer is to be applied to the base material by dipping or painting, and more dilute solutions are used when the lacquer is to be sprayed. When the lacquer contains an insoluble material, it is advisable to use a mixture whose solid content is high so that the insoluble material does not settle rapidly. Such variations in the concentration are, of course, conventional practice in the paint industry, and form no critical part of this invention.

Finely divided silica preferably is incorporated into the lacquer in order to improve the toughness of the dried coating. The silica suitably is mixed with the terpolymer on a rubber mill. Subsequently, the mixture is dispersed in the solvent. Any amount of silica up to about 100 parts per 100 parts of terpolymer can be used and we usually use at least 10 parts. Best results are obtained when about 40 to 60 parts of silica are used.

Other materials which can be present optionally in the lacquer are other fillers, pigments, dyes and plasticizers. Preferably, such materials should not react chemically with the terpolymer. Fillers and pigments which react chemically with the carboxylic acid groups of the terpolymer are less suitable if by such reaction the terpolymer in the solution becomes cross-linked, or "vulcanized." For example, it is well known that zinc oxide, as well as other metallic oxides, hydroxides or carbonates, vulcanizes carboxylic rubbers in the solid state. Such vulcanization often occurs within a few hours even at room temperature. Therefore if such vulcanizing agents are present in the lacquer, it may gel and become worthless within a few hours' or days' storage. Other optionally used materials are carbon black, zinc sulfide and lead chromate.

The coating of the invention is applied to any rubber which contains a sufficient amount of olefinic unsaturation to be vulcanizable. Typical of such rubbers are polybutadiene; Hevea; the rubbery copolymers of a conjugated diolefin with any of styrene, methylstyrenes, acrylonitrile, acrylic-type esters, monovinylpyridines, or isobutylene; and neoprene (polychloroprene).

Typical lacquered articles embodying our invention are wire which is covered with rubber, hose, flexible fuel cells, auto mats, windlace, rubberized seat covers for furniture and auto seats, shoe soles and uppers, and tires. The lacquers are particularly valuable for coating white products, such as rubber footwear, because they produce very little yellowing during vulcanization of the rubber.

Windlace for automobile doors is an especially important embodiment of this invention. Conventional windlace is made by surrounding a core of vulcanized sponge rubber with a fabric lace. It has now been found that the vulcanized rubber core can be coated with any of the lacquers used in this invention to form windlace, containing no fabric, which is ready to be used in cars as soon as the coating dries. Because it contains no fabric lace it is cheaper than the conventional windlace. The new windlace also has a pleasing, glossy appearance which harmonizes well with the interior decoration of the car.

The lacquer can be applied to the rubber either before or after the latter is cured. Somewhat better adhesion is obtained when the lacquer is applied before cure rather than after cure. When the lacquer has been applied to uncured rubber, the latter must not then be cured in a mold under high pressure because the substrate rubber may strike through the lacquer. However, lacquered rubber products such as auto mats can be cured in a mold under low pressure without danger of striking through.

The following examples illustrate but do not limit the invention. All parts and percentages are by weight.

*Example 1*

A low-gel terpolymer of butadiene:acrylonitrile:methacrylic acid (50:35:15), made as described by Semon, loc. cit., was masticated on a cooled rubber mill until a smooth sheet was formed. The freshly milled polymer (5 parts) was then dissolved in 95 parts of MEK to form a clear solution.

Hevea rubber, GR-S (a rubbery copolymer of butadiene and styrene), Butyl rubber (a copolymer of isobutylene and isoprene), neoprene (polychloroprene), and a rubbery copolymer of butadiene and 2-methyl-5-vinylpyridine were compounded separately with conventional curing agents, accelerators, fillers, etc. appropriate to each individual rubber. Each compound stock was vulcanized in a mold, under conventional conditions to give optimum cure, to form specimens 1" x 6" x 0.1". The cured but unlacquered test pieces had the rather dull appearance normally characteristic of rubber goods, and when two unlacquered surfaces were slid across each other the "drag" or frictional resistance to sliding was considerable.

Test pieces from each cured stock were dipped into the terpolymer lacquer, the excess lacquer was allowed to drain off, and the specimens were dried in air. These laminated articles, which illustrate this invention, had a bright, glossy appearance which was much more pleasing than the appearance of the respective uncoated articles. The drag was greatly reduced. The coatings were not tacky, they adhered well to the rubber, and they resisted scratching by finger nails.

*Example 2*

The terpolymer of Example 1 was mixed on a rubber mill with compounding ingredients to form stocks of various colors until each stock was smooth and was homogeneous in appearance. The composition of the stocks follows:

| Stocks | Light Green | Yellow | Dark Blue | White |
| --- | --- | --- | --- | --- |
| Terpolymer | 100 | 100 | 100 | 100 |
| Hi-Sil a | 50 | 40 | 50 | 50 |
| Dioctyl phthalate | 3 | 5 | 5 | 4 |
| White pigment (finely divided titanium dioxide) | 13 | | | 70 |
| Green rubber dye | 1.5 | | | |
| Chrome yellow pigment (lead chromate) | | 60 | | |
| Blue rubber dye | | | 6 | | a A very finely divided, slightly hydrated silica.

Each stock was made into a lacquer by stirring 10 parts of the stock with 90 parts of MEK until the mixture appeared to be homogeneous. The dispersed silica and pigments settled out only slightly during storage of the lacquers for a month in closed containers. They could be dispersed again quickly by brief shaking or stirring.

Series of test pieces of the vulcanized rubbers described in Example 1 were dip-coated—one series for each one of the lacquers, and dried as in Example 1. The once-dipped articles were glossy and non-tacky and had good slip. They were not marred by the finger nails. The lacquer layer adhered well to the rubber. The appearance of the articles was still further improved by dipping the dried articles into the same respective lacquers a second time. The second dip was as brief as possible in order to minimize possible dissolving of the first lacquer coat.

This example shows typical lacquer formulations which are operable in this invention. The particular colors, fillers and plasticizer to be used shown are a matter of choice.

Some of the vulcanized rubbers used in Example 2 contained carbon black, while others were light colored. The lacquers, whose range of color was wide, were able to mask well the original color of the unvulcanized rubbers in every case, even after only one dip.

The coating can be removed easily from the rubber if desired. For example, a test piece consisting of the light green lacquer on a black stock was rubbed with a cloth which was wet with MEK. The lacquer, being a soluble, uncured material, came off quickly, easily and completely.

*Example 3*

The light green lacquer of Example 2 was rollercoated onto a conventional black, uncured reclaim stock. The coated stock was air-dried at room temperature until it was tack-free. Then it was heated in a press under slight pressure for 15 minutes at 298° F. to vulcanize the rubber. The coating on the cured stock was glossy, smooth, tack-free, flexible and tough. It was not scratched by finger nails, and it adhered well to the base stock. It could be completely and easily rubbed off the base stock by MEK, as described in Example 2.

*Example 4*

The clear lacquer of Example 1 was brushed onto three specimens of a conventional, uncured rubber footwear stock. The coatings were air-dried. One specimen was cured conventionally in hot air alone, the second in a mixture of air and ammonia, and the third in steam. All three coatings were bright, glossy, tack-free, flexible, tough, and adhered well to the base stock.

*Example 5*

Cured sponge rubber windlace to go around car doors was coated with the light green lacquer of Example 2. The air-dried lace, which contained no fabric reinforcement, was ready for installation in a car. The new, lacquered windlace of this invention was found to be superior to and cheaper than conventional windlace. The lacquer coat was non-tacky, flexible, tough, highly resistant to abrasion, had good slip, and was glossy and pleasing in appearance.

*Example 6*

Paracril (a rubbery copolymer of butadiene and acrylonitrile) was compounded conventionally with curatives, spread or calendered onto nylon cloth, and cured. The clear lacquer described in Example 1 was painted onto the rubber surface and air-dried. The tack-free coating improved the appearance, the slip and the ozone resistance of the composite article as compared with the unlacquered material.

*Example 7*

In the same manner as in the previous examples, lacquers for coating rubbers are prepared from the following stocks

| | A | B | C |
| --- | --- | --- | --- |
| Butadiene/acrylonitrile/methacrylic acid copolymer (50:35:15) | 100 | 100 | 100 |
| Hi-Sil | 25 | 25 | |
| Zinc oxide | 0.6 | | 0.6 |

The lacquers made from stocks A and B are superior to that made from C. Resinous materials such as polyvinyl chloride, or phenolic resin (e. g. Durez resin) may be added to the lacquer stock in minor amount, e. g., 5 or 10 parts.

*Example 8*

A terpolymer of butadiene:acrylonitrile:methacrylic acid (50:30:20) was made into a lacquer which was like the green lacquer of Example 2 except for the difference in the terpolymer. This lacquer was applied to cured sponge rubber windlace as in Example 5. This lacquered windlace, which contained no fabric, was as suitable for use in automobiles as that of Example 5.

*Example 9*

A terpolymer of butadiene:acrylonitrile:methacrylic acid (65:31:4) was made into a lacquer which was like the green lacquer of Example 2 except for the difference in the terpolymer. The uncured reclaim stock of Example 3 was coated with the lacquer, and the laminated article was dried and vulcanized as shown therein. The coating had the same properties as that of Example 3.

Examples 8 and 9 show that the proportions of the monomers in the terpolymer used in the lacquers of this invention can be varied widely.

Having thus described our invention, what we claim and desire to protect by Letters Patent is:

1. A composite article comprising a vulcanized rubbery material and a glossy, non-tacky, scratch-resistant exterior surface coating film thereon comprising as the sole essential ingredient a terpolymer containing combined from about 40% to 80% of butadiene, from about 10% to 50% of acrylonitrile, and from about 2% to 25% of methacrylic acid, said film being flexible and firmly adherent to said vulcanized rubbery material and serving as a slip finish that protects said rubbery material from attack by ozone.

2. An article as in claim 1, in which the said surface coating film contains from 10 to 100 parts of finely divided silica per 100 parts of the said terpolymer.

References Cited in the file of this patent

UNITED STATES PATENTS

| | | |
|---|---|---|
| 1,973,000 | Konrad et al. | Sept. 11, 1934 |
| 2,395,017 | Semon | Feb. 19, 1946 |
| 2,648,613 | Shinkle | Aug. 11, 1953 |
| 2,681,327 | Brown | June 15, 1954 |